(12) United States Patent
Heller et al.

(10) Patent No.: US 10,911,094 B1
(45) Date of Patent: Feb. 2, 2021

(54) CHIRP SEQUENCE SYNTHESIS IN A DYNAMIC DISTRIBUTION NETWORK

(71) Applicant: SEMICONDUCTOR COMPONENTS INDUSTRIES, LLC, Phoenix, AZ (US)

(72) Inventors: Tom Heller, Karmiel (IL); Danny Elad, Kibutz Matzuva (IL); Oded Katz, Ganei-Tikva (IL); Michael Grubman, Kiryat Atta (IL); Benny Sheinman, Haifa (IL); Dan Corcos, Tel Aviv (IL)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/696,623

(22) Filed: Nov. 26, 2019

(51) Int. Cl.
*H04B 1/69* (2011.01)
*H04L 27/10* (2006.01)
*G01S 13/931* (2020.01)
*G01S 7/40* (2006.01)
*G01S 7/35* (2006.01)
*G01S 13/34* (2006.01)

(52) U.S. Cl.
CPC ............ *H04B 1/69* (2013.01); *G01S 7/354* (2013.01); *G01S 7/4004* (2013.01); *G01S 13/343* (2013.01); *G01S 13/931* (2013.01); *H04L 27/103* (2013.01); *H04B 2001/6912* (2013.01)

(58) Field of Classification Search
CPC ......... H04L 27/0008; H04L 2027/0016; H04L 27/103; H04B 10/40; H04B 1/44; H04B 1/48; H04B 1/69
USPC ............... 375/130, 139, 267, 299, 347–349
See application file for complete search history.

(56) References Cited

U.S. PATENT DOCUMENTS

| | | | | |
|---|---|---|---|---|
| 6,362,685 B1* | 3/2002 | Vagher | ............ | H03F 3/602 330/124 R |
| 6,587,072 B1* | 7/2003 | Gresham | ............ | G01S 7/282 342/25 R |
| 8,331,289 B1* | 12/2012 | Lee | ............ | H04B 1/006 370/328 |

(Continued)

FOREIGN PATENT DOCUMENTS

DE 102013216251 A1 12/2015

OTHER PUBLICATIONS

Igal Bilik et al., "Automotive Multi-mode Cascaded Radar Data Processing Embedded System," IEEE 978-1-5386-4167, May 2018, pp. 0372-0376.

(Continued)

*Primary Examiner* — Emmanuel Bayard
(74) *Attorney, Agent, or Firm* — Ramey & Schwaller, LLP

(57) ABSTRACT

An array of one or more integrated circuits includes at least one local input port to receive a chirp signal from a local generator; one or more primary input ports to each receive a respective chirp signal from a remote source; a primary switch arrangement operable to switch between the chirp signals from the at least one local input port and the one or more primary input ports to produce a composite signal having a chirp sequence with at least one chirp that begins during a settling period of a previous chirp; and one or more primary output ports to supply a local oscillator signal to a transmitter and a receiver based on the composite signal. The roles of master circuit and follower circuit can change during operation of the array.

20 Claims, 12 Drawing Sheets

(56) References Cited

U.S. PATENT DOCUMENTS

| | | | |
|---|---|---|---|
| 2009/0253384 A1* | 10/2009 | Gorbachov | H04B 1/44 |
| | | | 455/83 |
| 2010/0226292 A1* | 9/2010 | Gorbachov | H04B 7/0817 |
| | | | 370/280 |
| 2012/0314730 A1 | 12/2012 | McCorkle et al. | |
| 2013/0300499 A1* | 11/2013 | Sharawi | H01Q 3/38 |
| | | | 330/124 R |
| 2018/0156890 A1 | 6/2018 | Li et al. | |
| 2019/0235050 A1* | 8/2019 | Maligeorgos | H03F 3/45179 |
| 2020/0007309 A1* | 1/2020 | Vigier | H04L 7/065 |
| 2020/0007310 A1* | 1/2020 | Pavao Moreira | H04L 7/065 |
| 2020/0028722 A1* | 1/2020 | Chandrashekar | H03M 1/68 |
| 2020/0103495 A1* | 4/2020 | Iwasa | G01S 7/4008 |

OTHER PUBLICATIONS

Andreas Och et al., "A Scalable 77 GHz Massive MIMO FMCW Radar by Cascading Fully-Integrated Transceivers," Proceedings of 2018 Asia-Pacific Microwave Conference, pp. 1235-1237.

* cited by examiner

CHIRP SEQUENCE SYNTHESIS IN A DYNAMIC DISTRIBUTION NETWORK

FIELD

This application relates generally to frequency-modulated continuous wave (FMCW) radar systems, and more particularly to systems that employ multiple chirp generators when generating a chirp sequence.

BACKGROUND

In the quest for ever-safer and more convenient transportation options, many car manufacturers are developing self-driving cars which require an impressive number and variety of sensors, often including arrays of acoustic and/or electromagnetic sensors to monitor the distance between the car and any nearby persons, pets, vehicles, or obstacles. Attempts to synchronize chirp signals across arrays have not been wholly satisfactory. Thus, there is room for improvement in the art.

SUMMARY

In accordance with at least one example of this disclosure, an integrated circuit comprises: at least one local input port to receive a chirp signal from a local generator; one or more primary input ports to each receive a respective chirp signal from a remote source; a primary switch arrangement operable to switch between the chirp signals from the at least one local input port and the one or more primary input ports to produce a composite signal having a chirp sequence with at least one chirp that begins during a settling period of a previous chirp; and one or more primary output ports to supply a local oscillator signal to a transmitter and a receiver based on the composite signal.

In accordance with one or more other examples of this disclosure, an integrated circuit comprises: at least one primary input port to receive an amplified chirp signal; one or more primary output ports to supply a local oscillator signal to a transmitter and a receiver based at least in part on the amplified chirp signal; multiple secondary input ports to each receive a respective chirp signal from a remote source; multiple repeater ports to produce multiple copies of the amplified chirp signal; and a secondary switch arrangement operable to switch between the chirp signals from the multiple secondary input ports to provide to the multiple repeater ports the amplified signal having a chirp sequence with at least one chirp that begins during a settling period of a previous chirp.

In accordance with at least one other example of this disclosure, a radar system that comprises: a first plurality of integrated circuits, each of the first plurality of integrated circuits having: a local generator that provides a chirp signal; at least one input port that receives a chirp signal from a remote source; one or more repeater ports operable to provide multiple copies of an amplified chirp signal; a primary output port that supplies a local oscillator signal to a transmitter or receiver; at least one switch arrangement operable to combine multiple chirp signals to a produce a composite signal having a chirp sequence with at least one chirp that begins during a settling period of a previous chirp; and a wiring configuration enabling the first plurality of integrated circuits to collectively produce at least one composite signal, to convert the at least one composite signal into multiple copies of an amplified chirp signal, and to each provide a copy of the amplified chirp signal as the local oscillator signal to a transmitter or receiver.

DETAILED DESCRIPTION

The accompanying drawings and following detailed description do not limit the disclosure, but on the contrary, they provide the foundation for understanding all modifications, equivalents, and alternatives falling within the scope of the appended claims. Specific configurations, parameter values, and operation examples are provided for the purposes of explanation rather than for circumscribing any scope of disclosure.

Figure 1:
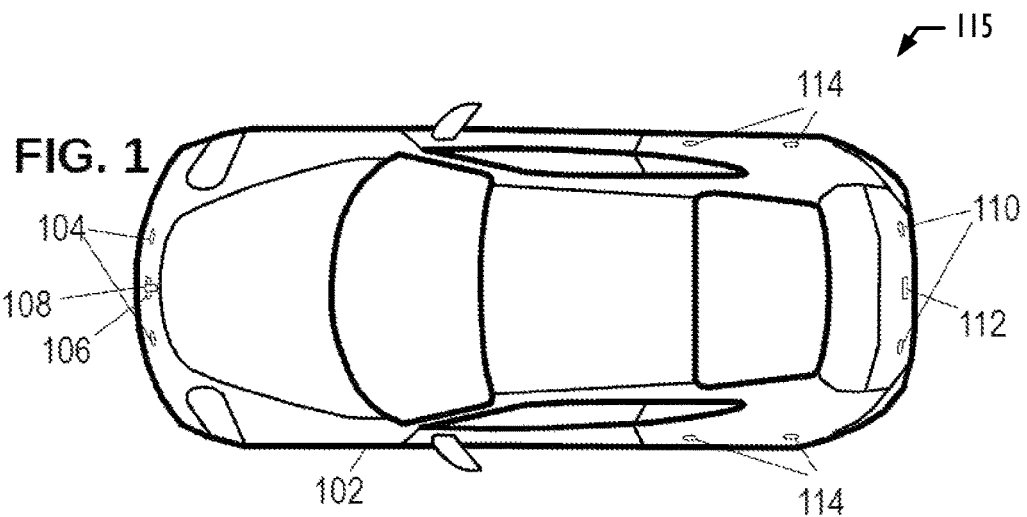
FIG. 1 is an overhead view of an illustrative vehicle equipped with sensors.

FIG. 1 shows an illustrative vehicle 102 equipped with an array of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid-range sensing (e.g., for rear collision warning) may be placed behind the back bumper cover. Antennas 114 for short range sensing (e.g., for blind spot monitoring and side obstacle detection) may be placed behind the car fenders. Each antenna and each set of antennas may be grouped in one or more arrays. Each array may be controlled by a radar array controller (205). Each set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
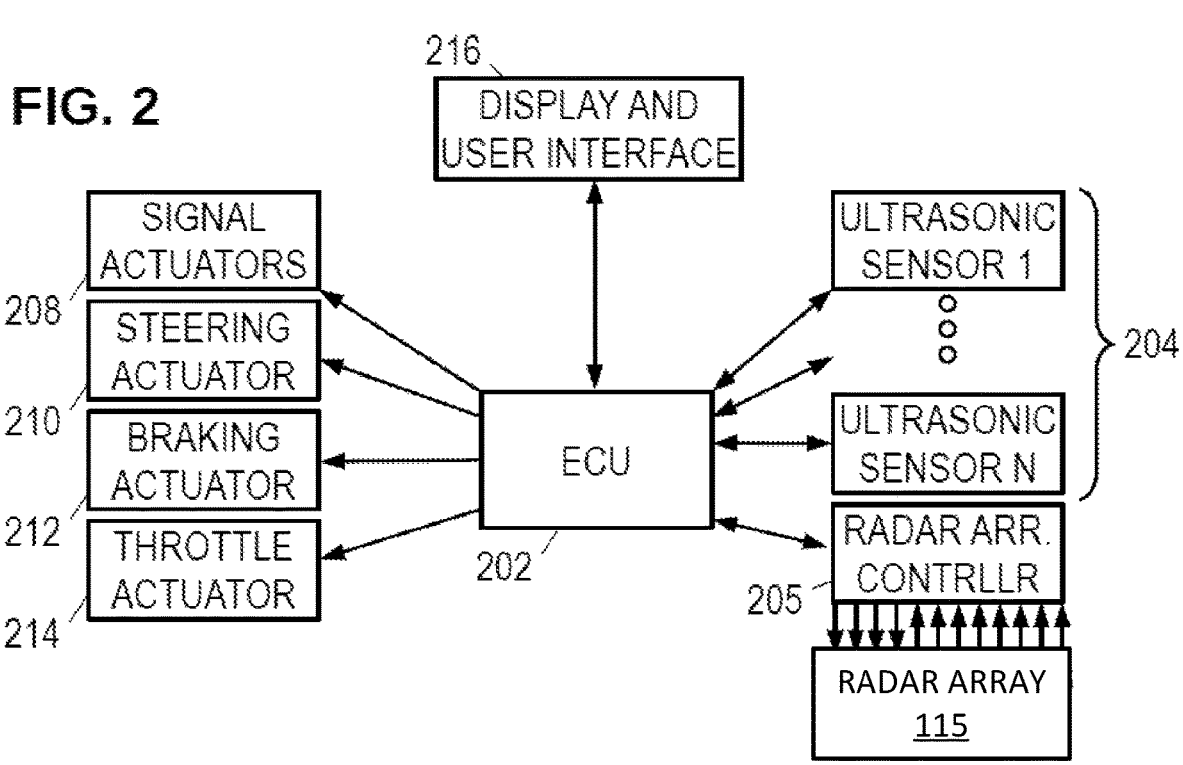
FIG. 2 is a block diagram of a driver-assistance system, in accordance with an example of this disclosure.

FIG. 2 shows an electronic control unit (ECU) 202 coupled to the various ultrasonic sensors 204 and a radar array controller 205 as the center of a star topology. Other topologies including serial, parallel, and hierarchical (tree) topologies, are also suitable and contemplated for use in accordance with the principles disclosed herein. The radar array controller 205 couples to the transmit and receive antennas in the radar antenna array 106 to transmit electromagnetic waves, receive reflections, and determine a spatial relationship of the vehicle to its surroundings. The radar array controller 205 couples to carrier signal generators (404). In at least one example, the radar array controller 205 controls the timing and order of actuation of a plurality of carrier signal generators (404).

To provide automated parking assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more ECU 202, and may be used by the ECU 202 to determine the automobile's status. The ECU 202 may further act on the status and incoming information to actuate various signaling and control transducers to adjust and maintain the automobile's operation. Among the operations that may be provided by the ECU 202 are various driver-assist features including automatic parking, lane following, automatic braking, and self-driving.

To gather the necessary measurements, the ECU 202 may employ a MIMO radar system. Radar systems operate by emitting electromagnetic waves which travel outward from the transmit antenna before being reflected back to a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector and its velocity relative to the vehicle. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented.

Figure 3:
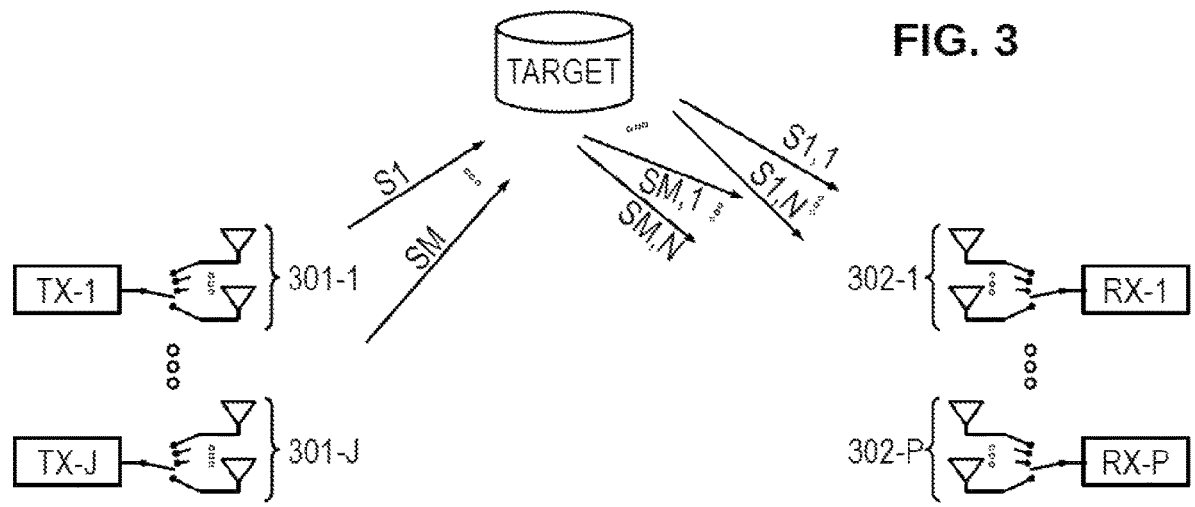
FIG. 3 is a schematic of a reconfigurable multiple input multiple output radar system, in accordance with an example of this disclosure.

FIG. 3 shows an illustrative system having a MIMO configuration, in which J transmitters are collectively coupled to M transmit antennas to send transmit signals. The M possible signals may variously reflect from one or more targets to be received via N receive antennas coupled to P receivers. Each receiver may extract the amplitude and phase or travel delay associated with each of the M transmit signals, thereby enabling the system to obtain N*M measurements (though only J*P of the measurements may be obtained concurrently). The processing requirements associated with each receiver extracting J measurements can be reduced via the use of time division multiplexing and/or orthogonal coding. The available antennas are systematically multiplexed to the available transmitters and receivers to collect the full set of measurements for radar imaging.

Figure 4:
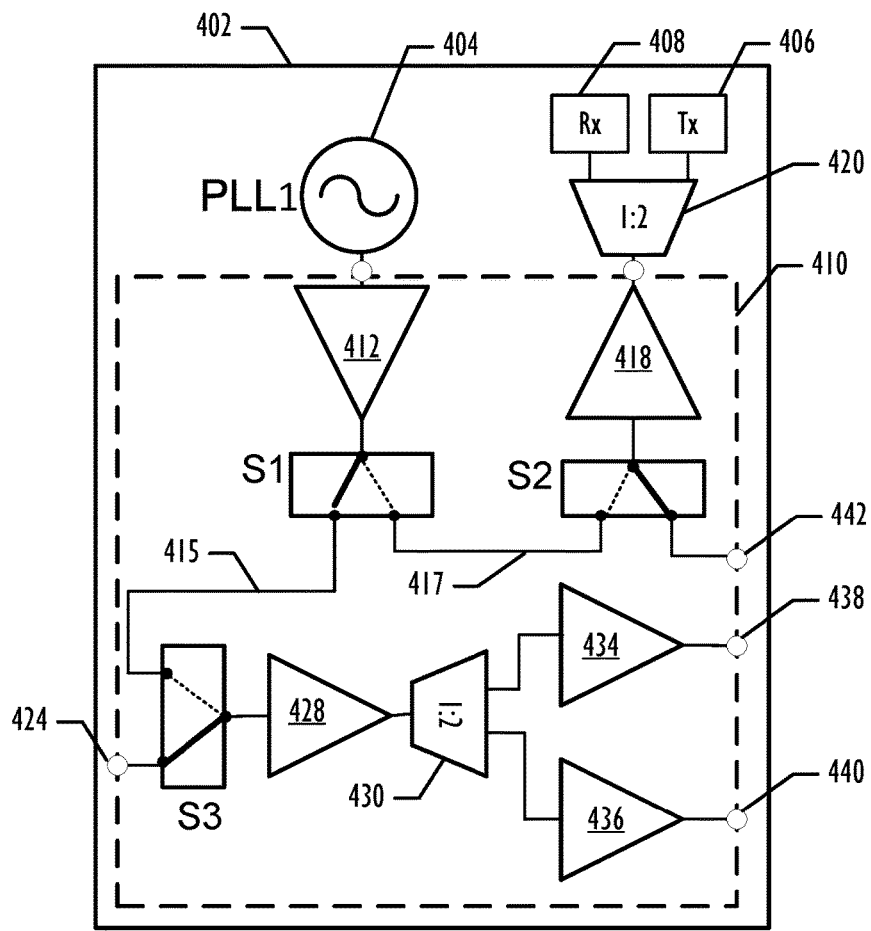
FIG. 4 illustrates a radar transceiver circuit in block diagram form, in accordance with an example of this disclosure.

FIG. 4 illustrates a radar transceiver circuit 402 in block diagram form, in accordance with an example of this disclosure. In at least one example, the radar transceiver circuit 402 is implemented as an integrated circuit in a packaged chip. Radar transceiver circuit 402 includes a carrier signal generator 404, a splitter 420, a receiver 408, a transmitter 406 and a local oscillation (LO) circuit 410.

In examples of this disclosure, carrier signal generator 404 is coupled to the radar array controller 205. Carrier signal generator 404 includes a chirp generator to create a frequency-modulated continuous-wave (FMCW) signal. The chip rate of the carrier signal generator 404 may be controlled by the radar array controller 205. In at least one example, the carrier signal generator 404 can be deactivated by the radar array controller 205 to provide an unmodulated carrier signal. The carrier signal generator 404 may be implemented as a local oscillation (LO) signal generator as a fractional-N phase lock loop (PLL) with a $\Sigma\Delta$ controller, or as a direct-digital synthesis (DDS) generator.

Carrier signal generator 404 is connected to transmitter (Tx) 406 and receiver (Rx) 408 through LO distribution circuit 410 and splitter 420. Carrier signal generator 404 generates a signal (e.g., a chirp signal). The LO distribution circuit 410 receives the signal from carrier signal generator 404 at amplifier (AMP) 412. (Additionally, the LO distribution circuit 410 has two input ports—primary input port 442 and secondary input port 424—through which the LO distribution circuit 410 can receive signals from sources external to radar transceiver circuit 402. External sources can include other radar transceiver circuits 402. AMP 412 amplifies the signal from carrier signal generator 404. LO distribution circuit 410 includes a primary switching arrangement comprising switch S1 and switch S2, and a secondary switching arrangement comprising switch S3. AMP 412 is connected to switch S1. Switch S1 couples the signal alternately to switch S2 and switch S3. Switch S2 selects either line 417 carrying the oscillation signal from S1 or an input signal received at primary input port 442. In examples of this disclosure, the switches S1-S3 may be implemented as single-pole double-throw (SPDT) integrated transistor switches.

Switch S2 delivers the signal that switch S2 receives to AMP 418. The signal is amplified by AMP 418 and delivered to splitter 420. Splitter 420 delivers one copy of the signal from AMP 418 to transmitter 406 and one copy to receiver 408.

Switch S3 selects either the signal from S1 at line 415 or an input signal received at secondary input port 424. The signal selected by switch S3 is delivered to AMP 428. The delivered signal is amplified by AMP 428. Copies of the amplified signal are delivered to AMP 434 and AMP 436 through splitter 430. AMP 434 amplifies a copy of the signal and delivers the amplified copy of the signal to repeater output port 438. AMP 436 amplifies a copy of the signal and delivers it to repeater output port 440. Thus, repeater output port 438 and repeater output port 440 will propagate an electromagnetic wave originating at generator 404 or received at secondary input port 424, depending on the selection position of S3. Likewise, transmitter 406 will propagate an electromagnetic wave originating at generator 404 or received at primary input port 442, depending on the selection position of S2. In at least one example, radar transceiver circuit 402 includes one or more frequency multipliers and one or more mixers (not shown). For example, a frequency multiplier positioned between positioned between amplifier 412 and switch S1 may increase the chirp signal carrier frequency. As another example, a frequency multiplier may be positioned between amplifier 418 and splitter 420.

Figure 5:
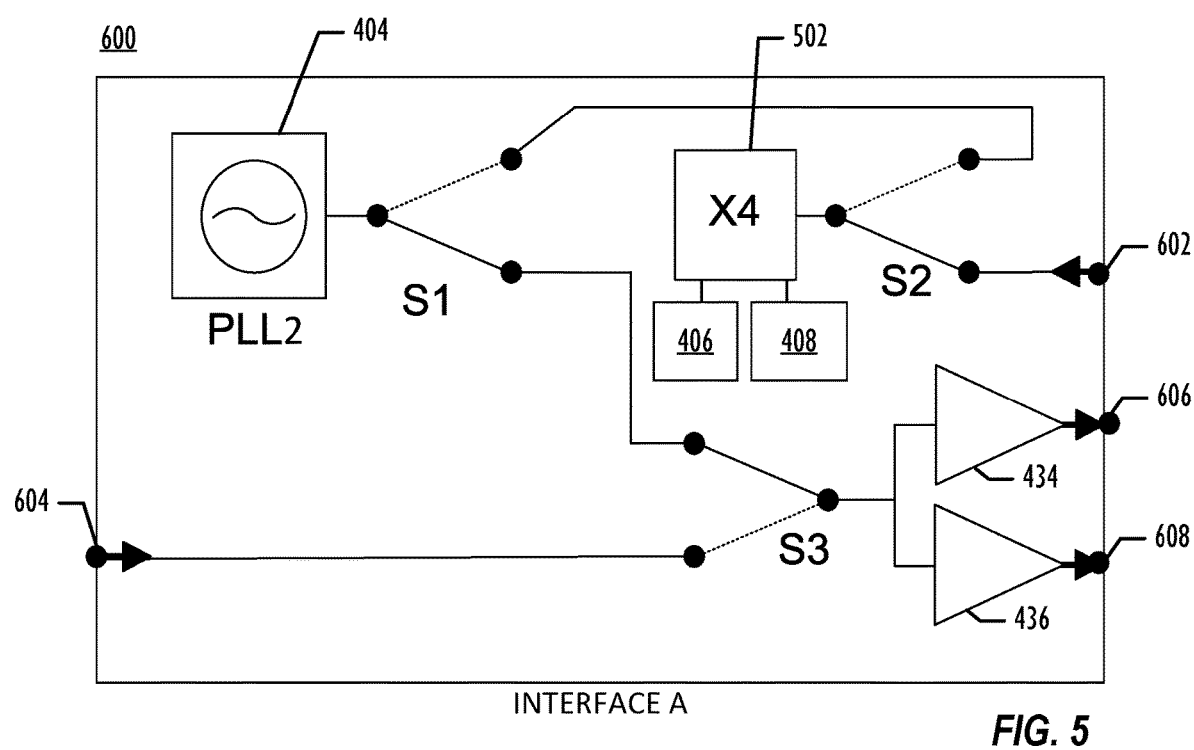
FIG. 5 illustrates a radar interface, in accordance with an example of this disclosure.

FIG. 5 illustrates a radar transceiver circuit 600, in accordance with an example of this disclosure. In at least one example, radar transceiver circuit 600 includes some or all of the same or similar components as transceiver circuit 402. Some of these components are not shown in FIG. 5 in order to facilitate understanding of some of the principles that follow. Radar transceiver circuit 600 comprises a signal generator 404 (e.g., PLL1) connected to a frequency multiplier circuit 502. Depending on the switching positions of switch S1 and switch S2, a chirp signal generated by PLL1 or a chirp signal received at primary input port 602 will be fed to frequency multiplier circuit 502. Frequency multiplier circuit 502 increases the frequency of the received signal by a factor of four. Copies of the chirp signal are delivered to transmitter 406 and receiver 408. As will be explained in greater detail, a chirp signal that is received at primary input port 602 may have originated at PLL1 and been returned to primary input port 602 through a return path that includes one or more transceiver circuits 600. For reasons that will become evident, transceiver circuit 600 will also be referred to as interface-A within this disclosure.

Figure 6A:
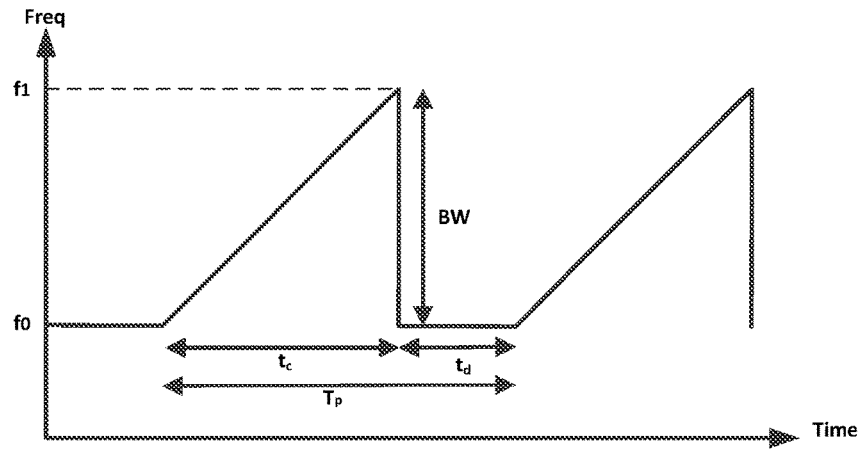
FIG. 6A illustrates an idealized chirp signal sequence, in accordance with an example of this disclosure.

Radar transceiver circuit 600 can function as a FMCW radar device, (as can transceiver circuit 402). FMCW radar transmits sequences of chirps in order to detect a target's range and relative velocity. A chirp is a frequency-modulated radio frequency (RF) signal whose frequency increases or decreases linearly over a time period. A single chirp is characterized by its carrier frequency $f_c$, chirp bandwidth $BW=f_1-f_0$, and chirp duration $T_c$. A chirp sequence is defined by the number of chirps N and by a chirp period $T_p=T_c+T_d$, where $T_d$ is a delay period between the end of one chirp and the beginning of the next chirp. The relationship between these parameters under ideal conditions illustrated in FIG. 6A. A chirp profile comprises the parameters that define a chirp sequence. The chirp profile of a chirp sequence includes information on the chirp duration, chirp bandwidth, delay between individual chirps, and delay at the beginning and end of the chirp sequence. The chirp profile is loaded to the radar module memory in advance by an external controller.

During operation, the signals that are reflected off different objects (targets) are received by the radar and mixed with the transmitted signal to generate an intermediate frequency (IF) signal whose frequency depends on the target range and relative velocity. An IF is a frequency to which a carrier wave is shifted as an intermediate step in transmission or reception. The IF signal is sampled by an analog-to-digital converter (ADC) (not shown) at a sampling frequency $f_s$ and processed by a digital signal processor (DSP), (e.g., ECU 202). The maximum detectable range $R_{max}$, the maximum velocity $v_{d,max}$, and the range and velocity resolutions $\Delta R$ and $\Delta v$ are given by the following equations:

$$R_{max} = \frac{f_s c_0 T_c}{4BW} \quad \text{(Eqn. 1)}$$

$$\Delta R = \frac{c_0}{2BW} \quad \text{(Eqn. 2)}$$

$$v_{d,max} = \frac{c_0}{4T_c f_c} \quad \text{(Eqn. 3)}$$

$$\Delta v = \frac{c_0}{2(N-1)T_p f_c} \quad \text{(Eqn. 4)}$$

In order to maximize the maximum velocity (Eqn. 3), the radar (e.g., 402) must transmit a chirp sequence with a high chirp repetition frequency (short chirp duration $T_c$). In at least one example of this disclosure, chirp bandwidth BW is high to produce a suitable maximum range resolution (Eqn. 2) when transmitting short duration chirps (having low $T_c$), (see FIG. 6A).

In at least one example of this disclosure, a FMCW chirp is generated by a PLL (e.g., 404) due to the PLL's ability to synthesize linear chirps at a high signal-to-noise ratio (SNR). At least one example is a vehicular radar application in which a PLL generates a chirp at a small integer fraction of the transmitted chirp frequency (e.g. ¼) in order to optimize phase noise. The frequency of the PLL output is then multiplied (e.g., by 4, see 502) before the output is transmitted by the radar transmitter (e.g., 408).

Figure 6B:
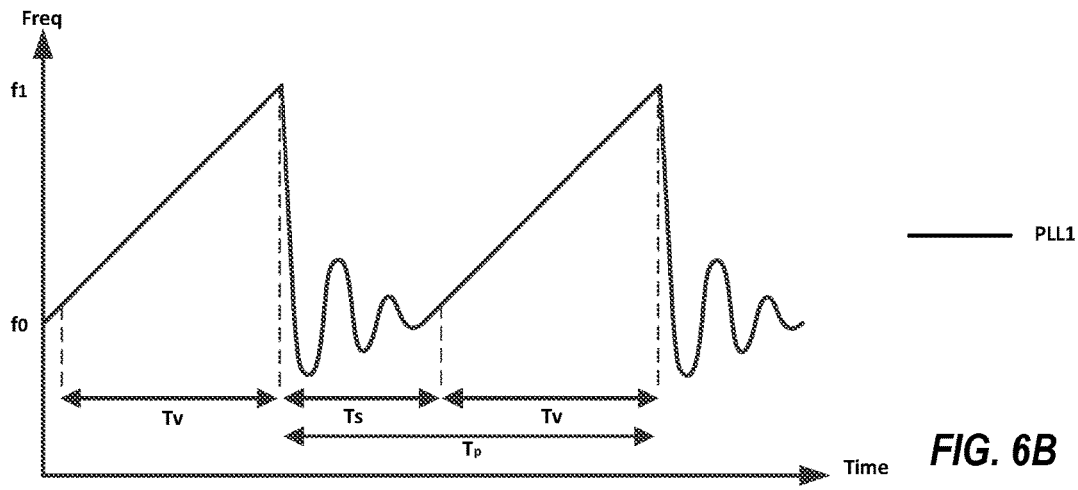
FIG. 6B illustrates a practical chirp signal sequence, in accordance with an example of this disclosure.

FIG. 6B illustrates a chirp sequence generated by a PLL 404. The chirp period $T_p$ consists of a valid period $T_v$ (during which a chirp is emitted) and a settling period $T_s$. The settling period $T_s$ in FIG. 6B must be smaller than the delay period $T_d$ of FIG. 6A. If minimal delay between chirps is desired then $T_s$ maps to $T_p$. When one chirp ends and another begins, the PLL frequency division modulus changes abruptly and the PLL output frequency experiences a transient overshoot until the PLL output frequency settles after a settling time $T_s$, during which the chirp cannot be used for radar detection. The entire chirp period $T_p$ may be divided into a settling time $T_s$ and a valid time $T_v$ during which the radar can be operated. When a radar transmits fast, closely-spaced chirps (e.g., to sense fast-moving objects), settling time $T_s$ occupies a large percentage of the chirp period $T_p$. (The phrase "fast chirp sequence" may be used to refer to a sequence derived from one or more chirp generators having a settling time $T_s$ comparable to the valid slope time $T_v$, and/or more than 20% of the chirp period $T_p$.) The chirp sequence in FIG. 6B could be generated by PLL1 of transceiver circuit 600, for example.

It can be advantageous to use more than two PLLs (e.g., 404) to synthesize a linear chirp sequence (e.g., with $T_{s,synth} \to 0$, where $T_{s,synth}$ stands for the settling time $T_s$ of a synthesized chirp sequence), if the desired chirp period $T_{p,synth}$ (synthesized chirp period) is comparable to or smaller than the settling time of the individual chirps $T_s$. In accordance with an example of this disclosure, the minimum number (N) of PLLs required to construct a fast chirp sequence with $T_{p,synth}=T_v$ and $T_{s,synth}=0$ is given by the following equation:

$$N \geq 1 + T_s/T_v \quad \text{(Eqn. 5)}$$

Examples of this disclosure include devices and methods of synthesizing fast chirp sequences which minimize the effects of settling times of chirp generators (e.g., 404). In at least one example, a fast chirp sequence with negligible (or even zero) settling time may be synthesized by superposition of chopped time-shifted chirp sections from multiple Pas (e.g., 404). This concept is illustrated in FIG. 6C.

Figure 6C:
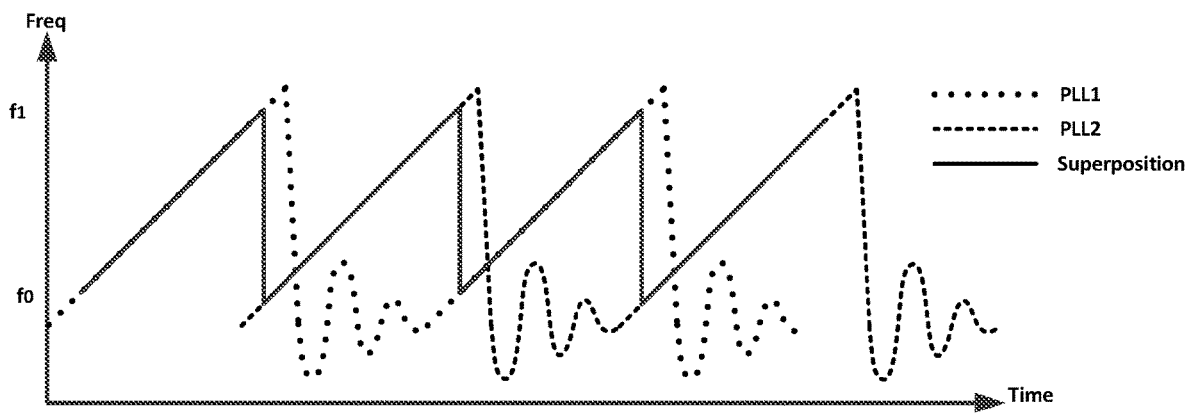
FIG. 6C illustrates a chirp signal superimposed upon another chirp signal, in accordance with an example of this disclosure.

FIG. 6C shows the chirp signal of PLL1 of transceiver circuit 600 and the chirp signal of a different PLL (e.g., PLL2) of a different transceiver circuit (for example, a second copy of transceiver circuit) on the same plot. When the reset times of PLL1 and PLL2 are excluded, and the chirp signal of PLL2 is superimposed on the chirp signal of PLL1, (e.g., by switching between the PLL signals), a digital sawtooth wave is produced. The principles discussed thus far will become even clearer when explained with references to arrays containing multiple transceiver circuits. Example transceiver circuits include interface-B (FIG. 7), interface-C (FIG. 8), and interface-D (FIG. 9).

Figure 7:
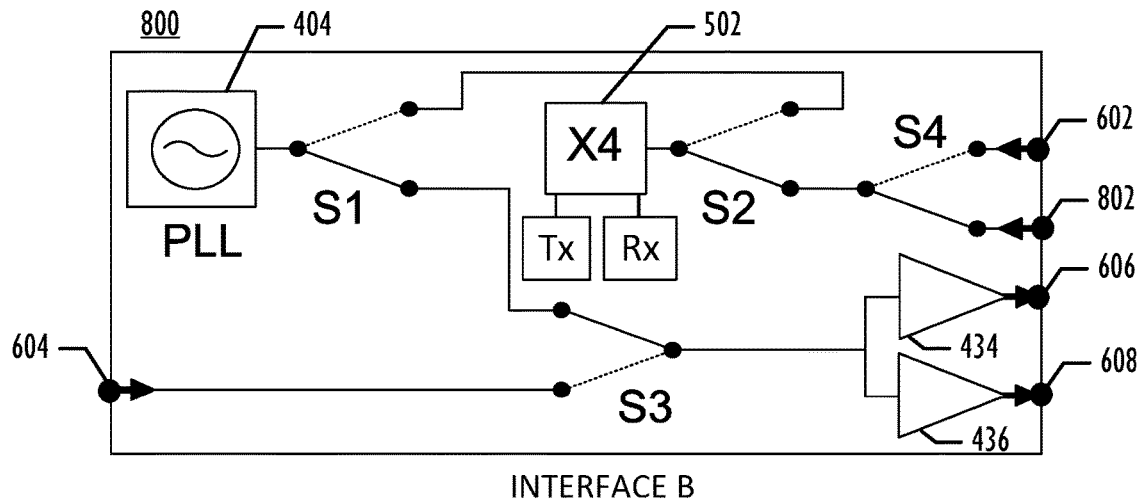
FIG. 7 illustrates another radar interface, in accordance with an example of this disclosure.

FIG. 7 illustrates transceiver circuit 800 (interface-B), in accordance with an example of this disclosure. Transceiver circuit 800 includes a primary switching arrangement comprising switch S1 and switch S2 and S4, and a secondary switching arrangement comprising switch S3. Interface-B is the same as interface-A except that interface-B includes switch S4 and additional primary input port 802. Switch S4 selects a signal received at secondary input port 602 or a signal received at primary input port 802, and delivers the selected signal to switch S2. Switch S2 of interface-B operates in the same manner as switch S2 of interface-A (and switch S2 of LO distribution circuit 410). Switches S2 and S4 enable clean switching between multiple chirp signals without restricting one of those signals to be from on-chip.

Figure 8:
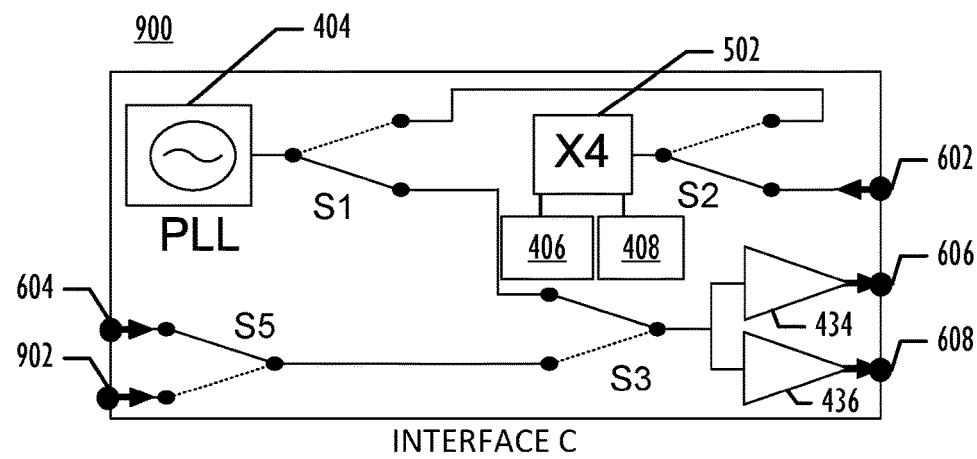
FIG. 8 illustrates another radar interface, in accordance with an example of this disclosure.

FIG. 8 illustrates transceiver circuit 900 (interface-C), in accordance with an example of this disclosure. Transceiver circuit 900 includes a primary switching arrangement comprising switch S1 and switch S2, and a secondary switching arrangement comprising switch S3 and switch S5. Interface-C is the same as interface-A except that interface-C includes switch S5 and an additional secondary input port 902. Switch S5 selects a signal received at secondary input port 604 or a signal received at secondary input port 902, and delivers the selected signal to switch S3. Switch S3 of interface-B operates in the same manner as switch S3 of interface-A (and interface-B and transceiver circuit 402).

Figure 9:
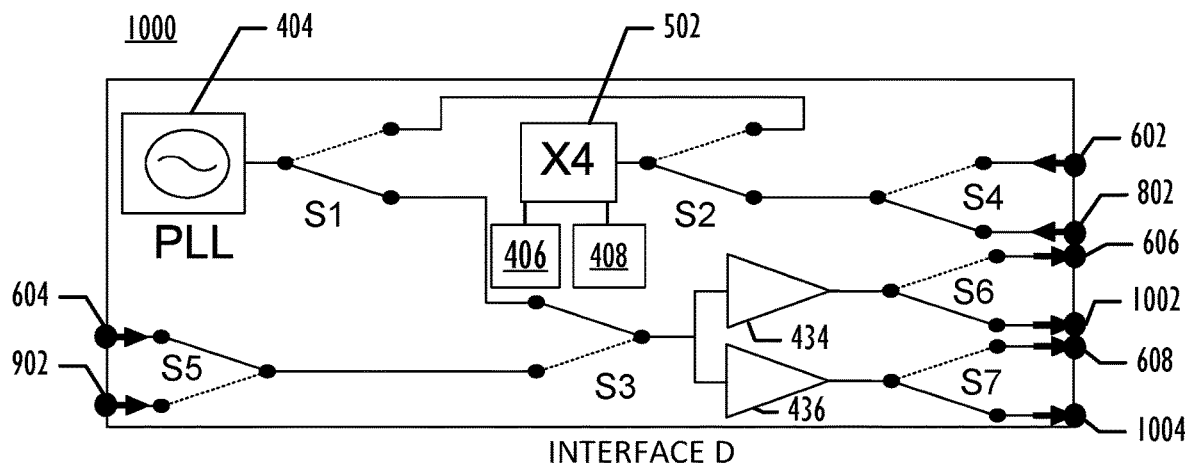
FIG. 9 illustrates a still another radar interface, in accordance with an example of this disclosure.

FIG. 9 illustrates transceiver circuit 1000 (interface-D), in accordance with an example of this disclosure. Transceiver circuit 1000 includes a primary switching arrangement comprising switch S1 and switch S2 and switch S4, and a secondary switching arrangement comprising switch S3 and switch S5. Interface-D includes all of the same components as interface-A. Additionally, (like interface-B), interface-D includes switch S4 and additional primary input port 802. Switch S4 selects a signal received at secondary input port 602 or a signal received at primary input port 802, and delivers the selected signal to switch S2. Switch S2 of interface-D operates in the same manner as switch S2 of interface-A. Also, (like interface-C), interface-D includes switch S5 and additional secondary input port 902. Switch S5 selects a signal received at secondary input port 604 or a signal received at secondary input port 902, and delivers the selected signal to switch S3. Switch S3 of interface-D operates in the same manner as switch S3 of interface-A and interface-B, and interface-C. Interface-D also includes two additional switches, S6 and S7, and two additional ports, repeater output port 1002 and repeater output port 1004. As described with respect to FIG. 4, amplifier 434 receives a signal. In interface-D, switch S6 couples amplifier 434 to either repeater output port 606 or repeater output port 1002. Also as described with respect to FIG. 4, amplifier 436 receives a copy of the signal that is received by amplifier 434. In interface-D, switch S7 couples amplifier 436 to either repeater output port 608 or repeater output port 1004.

Figure 10B:
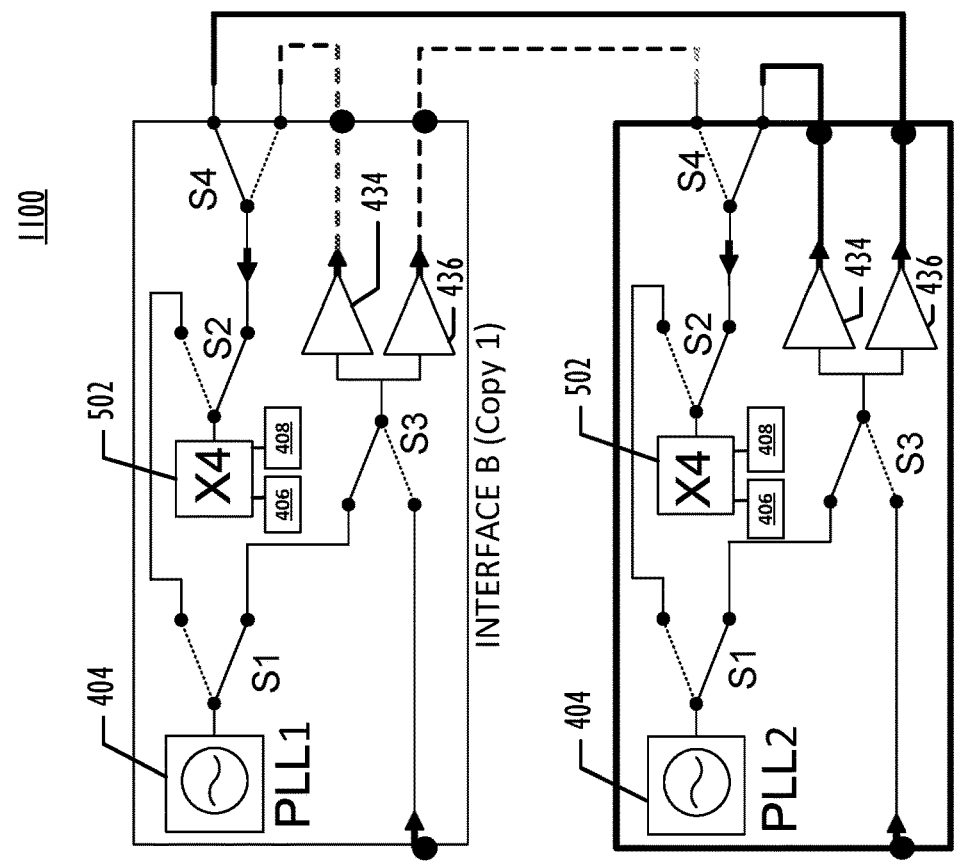
FIGS. 10A-B illustrate operation of a first radar array.
Figure 10A:
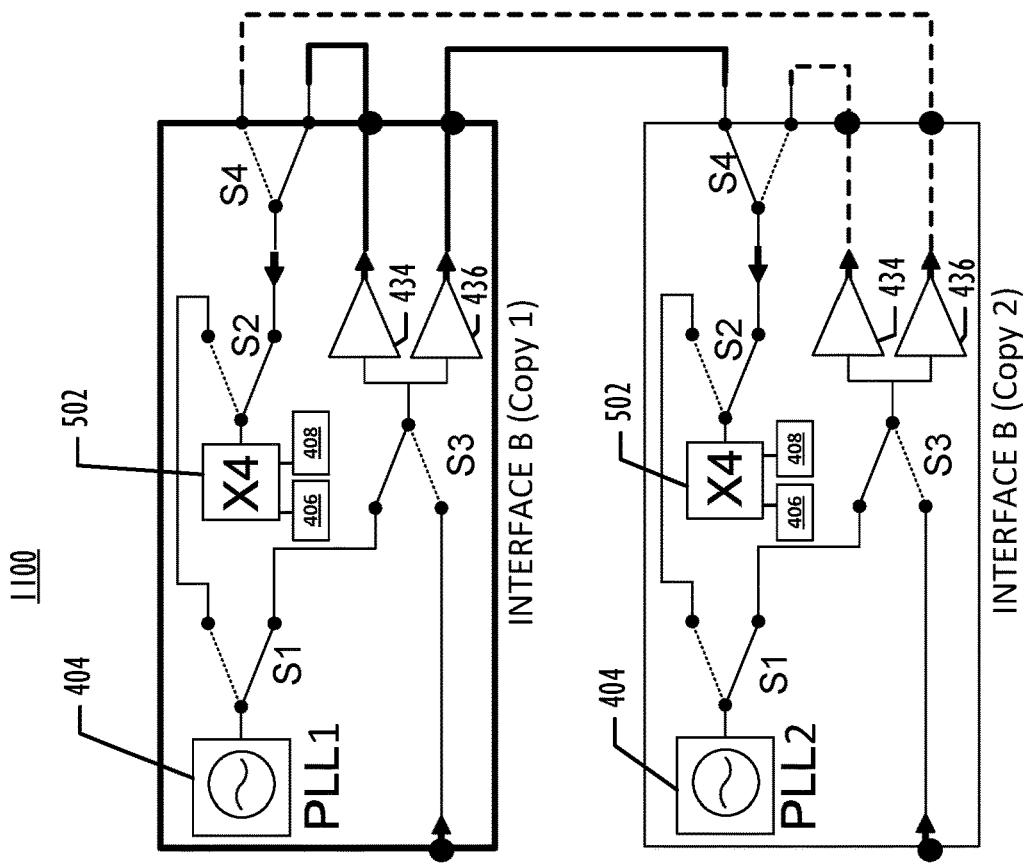

FIG. 10A illustrates a dual-PLL radar system 1100 at a first time, in accordance with an example of this disclosure. Radar system 1100 comprises a first copy ("B1") of interface-B connected to a second copy of interface-B ("B2"). FIG. 10B illustrates the dual-PLL radar system 1100 at a second time. System 1100 comprises a first PLL (404), PLL1 such as from a first copy of transceiver circuit 402, 600 and a second PLL, PLL2, such as from a second copy of transceiver circuit 402, 600. In FIG. 10A, the radar system 1100 transmits a first valid chirp section $T_v$ generated by PLL1 of the first copy of interface-B. Thereafter, in FIG. 10B, the radar system 1100 transmits a second valid section $T_v$ generated by PLL2 during PLL1's settling time $T_s$. Then, during the settling time of the PLL2, the chirp coming from the PLL1 (e.g., 404) is transmitted (FIG. 10A), and so on. Superposition of two chirp signals, such as generated by system 1100 is illustrated in FIG. 6C, in which the settling times of PLL1 overlap with the valid chirp sections $T_v$ of the PLL2, and vice-versa. At the first time (FIG. 10A), the signal from amplifier 434 of interface-B1 goes to switch S4 of interface-B1. Also at the first time, the signal from amplifier 436 of interface-B1 goes to switch S4 of interface-B2. At the second time, the signal from amplifier 434 of interface-B2 is delivered to switch S4 of interface-B2, and the signal from amplifier 436 of interface-B2, is delivered to switch S4 of interface-B1. Thus, in FIG. 10A, interface-B1 is the originator, or "master", while in FIG. 10B, interface-B1 is the master. During the time in which one copy is the master, the other copy is the follower. In at least one example of this disclosure, the rate at which the roles of master and follower are switched is controlled by array controller 205. It will be understood that for the configuration shown in FIGS. 10A-B, that either interface could be assigned to always be the master and the other always be the follower. It will be understood that for the configuration shown in FIGS. 10A-B, that either interface could be cascaded with one or more additional interfaces, (e.g., 402, 600, 800, 900, 1000).

In one or more examples of this disclosure, in order to operate several radar modules as a single array (e.g., 1100) the chirp generators (Pas) and the receiver ADC clocks of all the modules must be synchronized. To that end, each module has a chirp sequence start signal output pad and an ADC clock output pad (not shown). An array of modules (e.g., 1200) may be configured so that one module provides these two signals to all other modules (e.g. in a tree topology). In at least one example, while each module may be dynamically configured as a master in the sense that the module provides a chirp sequence to all other modules, only one module is predefined to provide the chirp sequence start signal and the ADC clock.

In examples of this disclosure, the chirp start signal is distributed to all modules at the same time, and the delay between the chirps of the different modules (which is applied to achieve a fast chirp sequence by superposition of several chirp sequences from several modules, see FIG. 6C) is defined in the chirp profile, and is loaded to each module in advance.

Figure 11A:
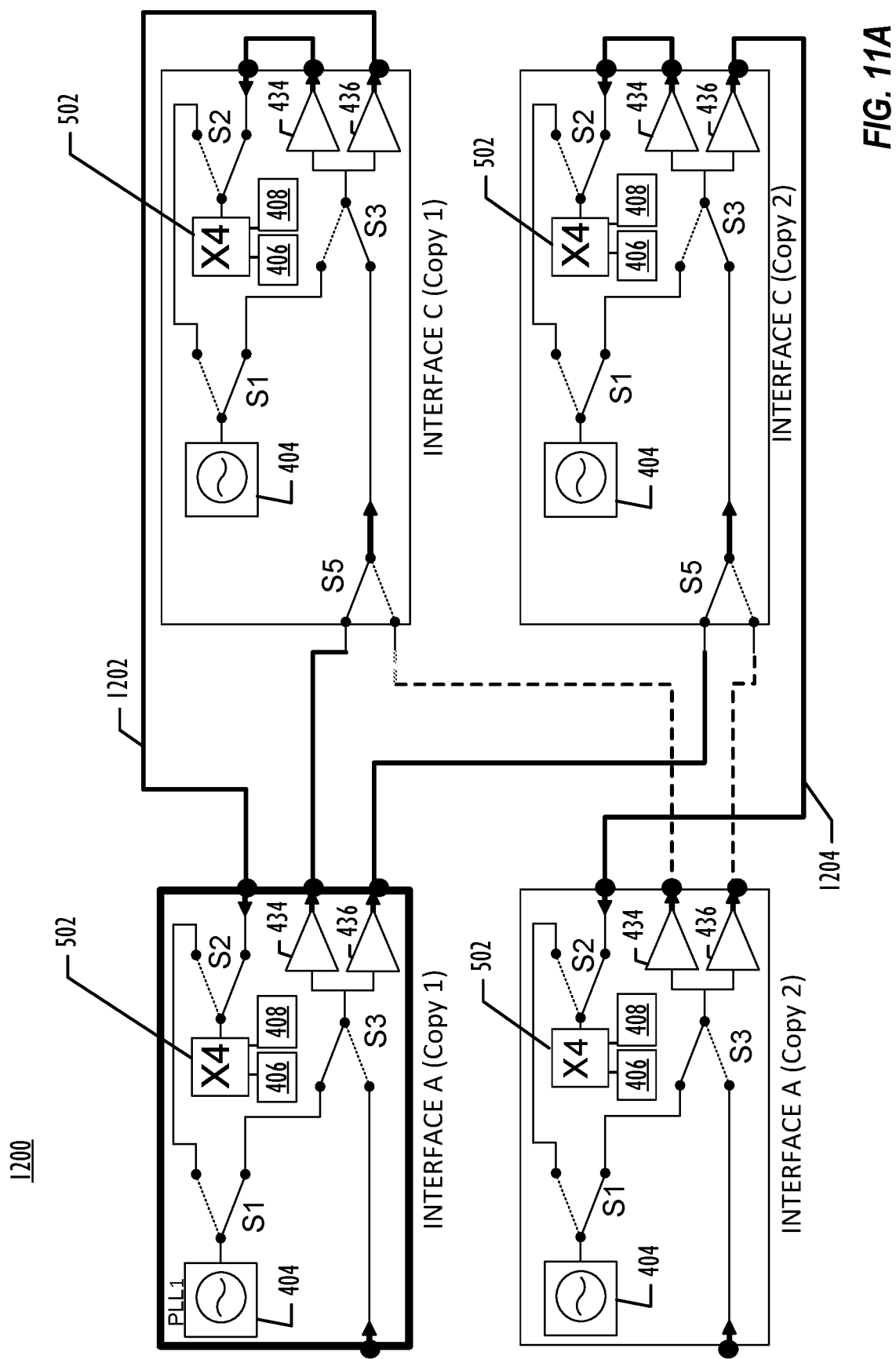
FIGS. 11A-B illustrate operation of a second radar array.

FIG. 11A illustrates an array 1200 comprising two copies of interface-A and two copies of interface-C, at a first time. At the first time, copy 1 of interface-A drives the array. The oscillation signal (e.g., chirp) from copy 1 of interface-A is delivered to switch S5 of interface-C (copy 1) and switch S5 of interface-C (copy 2). As shown, the oscillation signal from copy 1 of interface-A is delivered by interface-C (copy 1) to interface-A (copy 1) through return path 1202. The oscillation signal from copy 1 of interface-A is delivered by interface-C (copy 2) to interface-A (copy 2) through return path 1204.

Figure 11B:
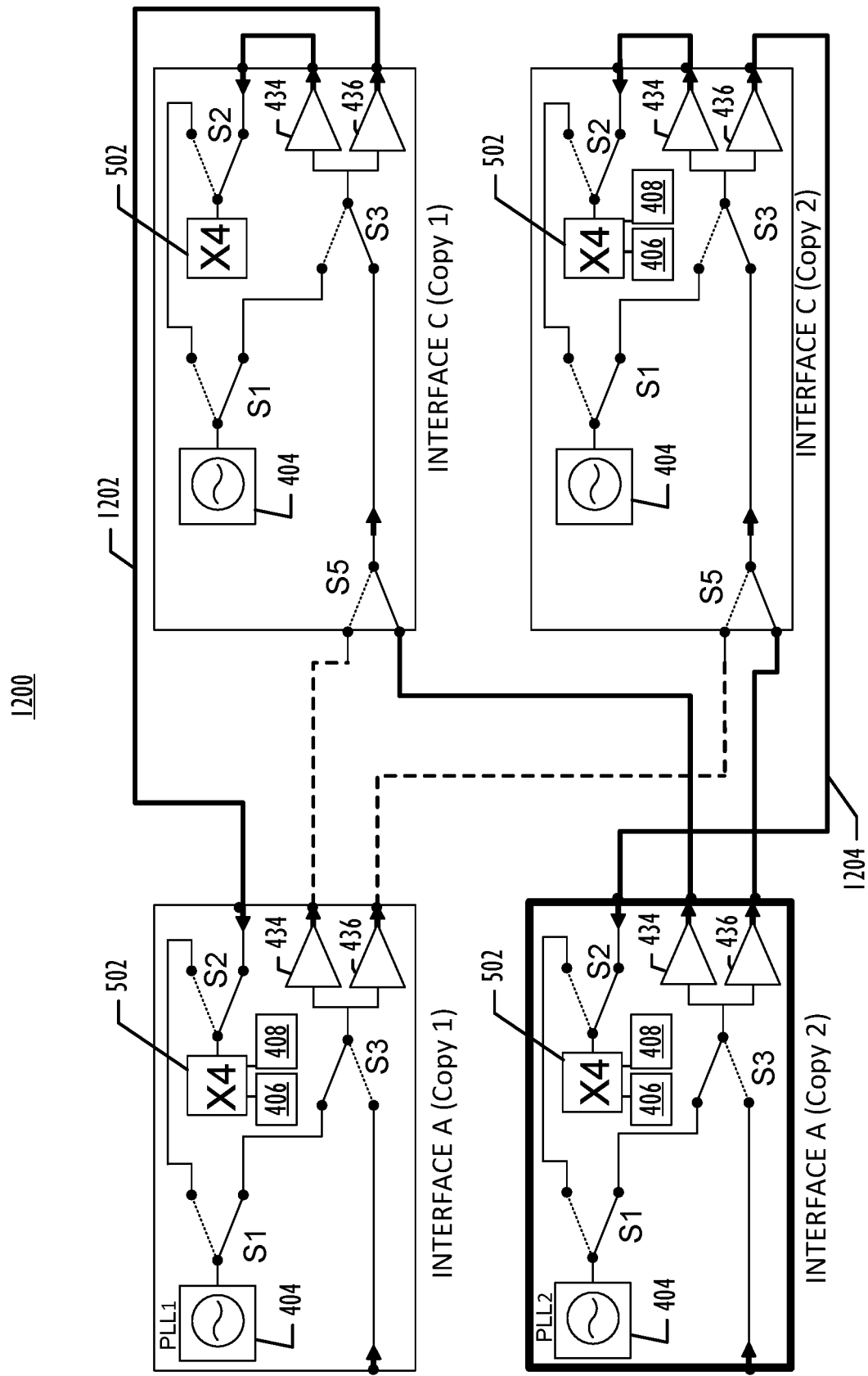

FIG. 11B illustrates array 1200 at a second time. At the second time, copy 2 of interface-A drives the array. The oscillation signal from copy 2 of interface-A is delivered to switch S5 of interface-C (copy 1) and switch S5 of interface-C (copy 2). As shown, the oscillation signal from copy 1 of interface-A is delivered by interface-C (copy 1) to interface-A (copy 1) through return path 1202. The oscillation signal from copy 2 of interface-A is delivered by interface-C (copy 2) to interface-A (copy 2) through return path 1204. Thus, the role of master alternates between copy 1 of interface-A and copy 2 of interface-A during operation of array 1200. During the periods in which copy 1 of interface-A is the master, copy 2 of interface-A and both copies of interface-C are followers. During the periods in which copy 2 of interface-A is the master, copy 1 of interface-A and both copies of interface-C are followers. In at least one example of this disclosure, the rate at which the roles of master and follower are switched is controlled by array controller 205. It will be understood that for the configuration shown in FIGS. 11A-B, that either copy 1 or copy 2 of interface-A could be assigned to always be the master and the other always be the follower. It will be understood that for the configuration shown in FIGS. 11A-B, that either interface could be cascaded with one or more additional interfaces, (e.g., 402, 600, 800, 900, 1000).

Figure 12A:
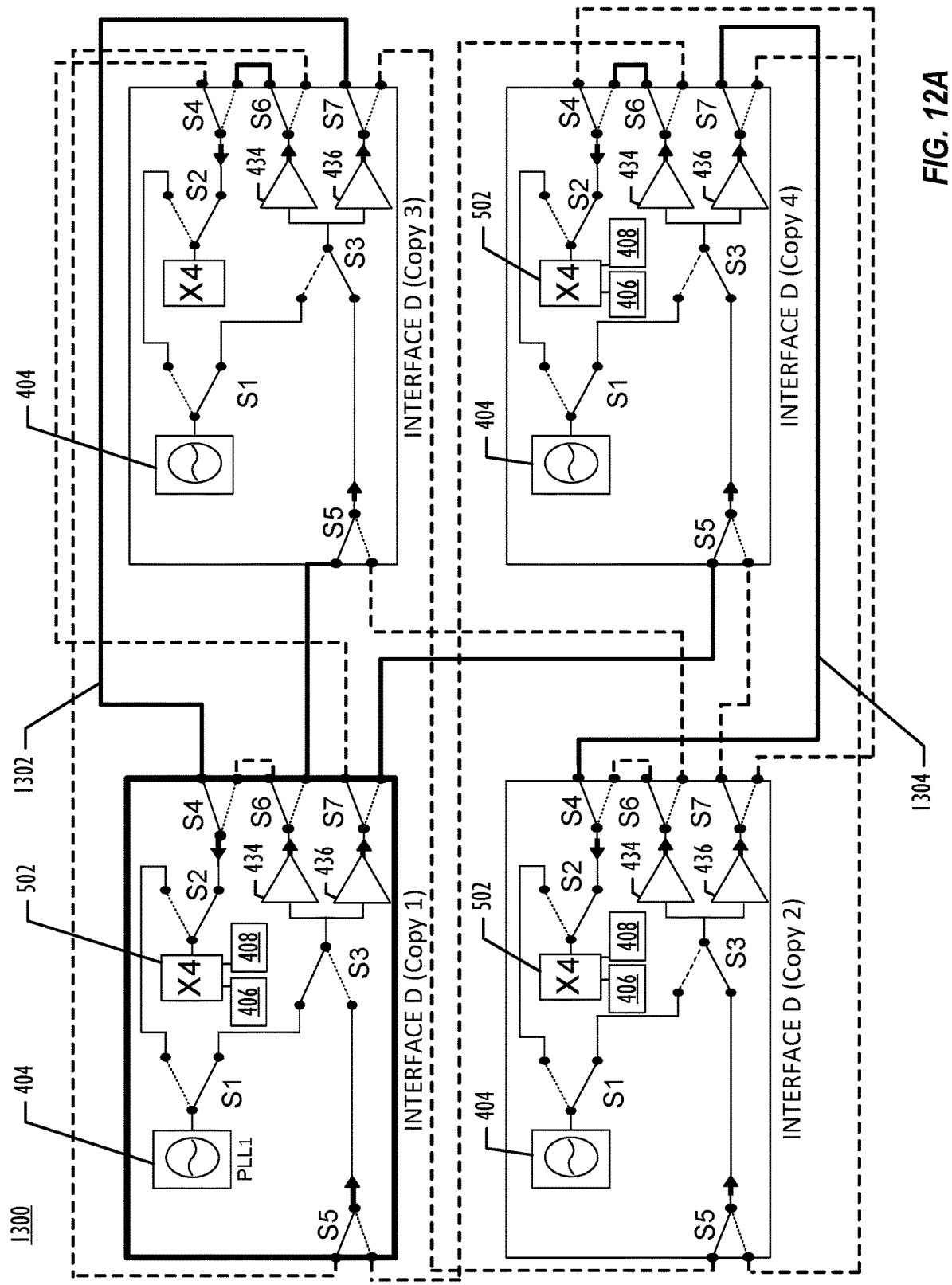
FIGS. 12A-D illustrate operation of a third radar array.

FIG. 12A illustrates an array 1300 comprising four copies of interface-D, at a first time. At the first time, copy 1 of interface-D drives the array. The oscillation signal from copy 1 of interface-D is delivered to switch S5 of interface-D (copy 3) and to switch S5 of interface-D (copy 4). As shown, the oscillation signal from copy 1 of interface-D is delivered by interface-D (copy 3) to interface-D (copy 1) through return path 1302. The oscillation signal from copy 1 of interface-D is delivered by interface-D (copy 4) to interface-D (copy 2) through return path 1304.

Figure 12B:
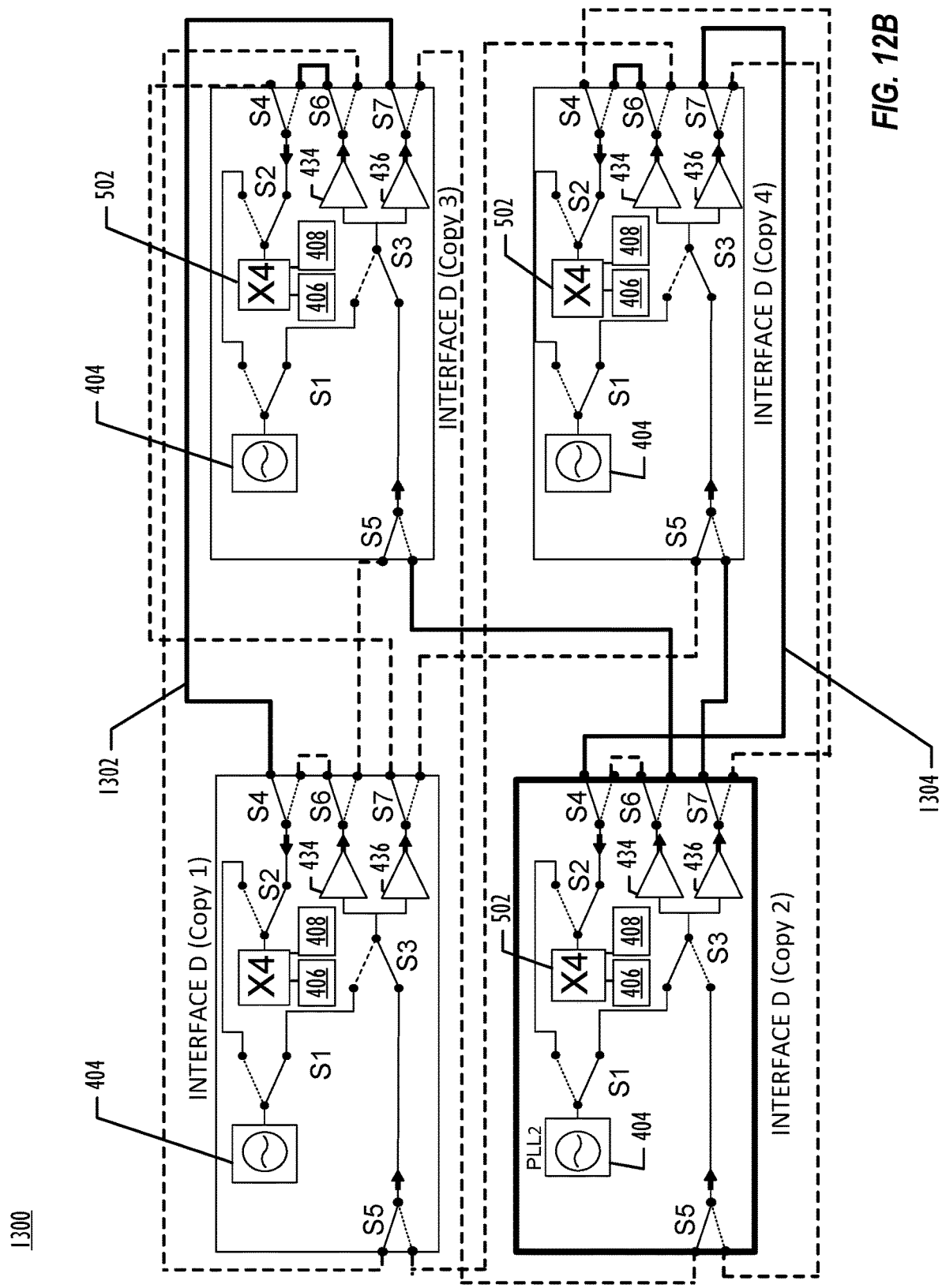

FIG. 12B illustrates array 1300 at a second time. At the second time, copy 2 of interface-D drives the array 1300. The oscillation signal from copy 2 of interface-D is delivered to switch S5 of interface-D (copy 3) and switch S5 of interface-D (copy 4). As shown, the oscillation signal from copy 2 of interface-D is delivered by interface-D (copy 3) to interface-D (copy 1) through return path 1302. The oscillation signal from copy 2 of interface-D is delivered by interface-D (copy 4) to interface-D (copy 2) through return path 1304.

Figure 12C:
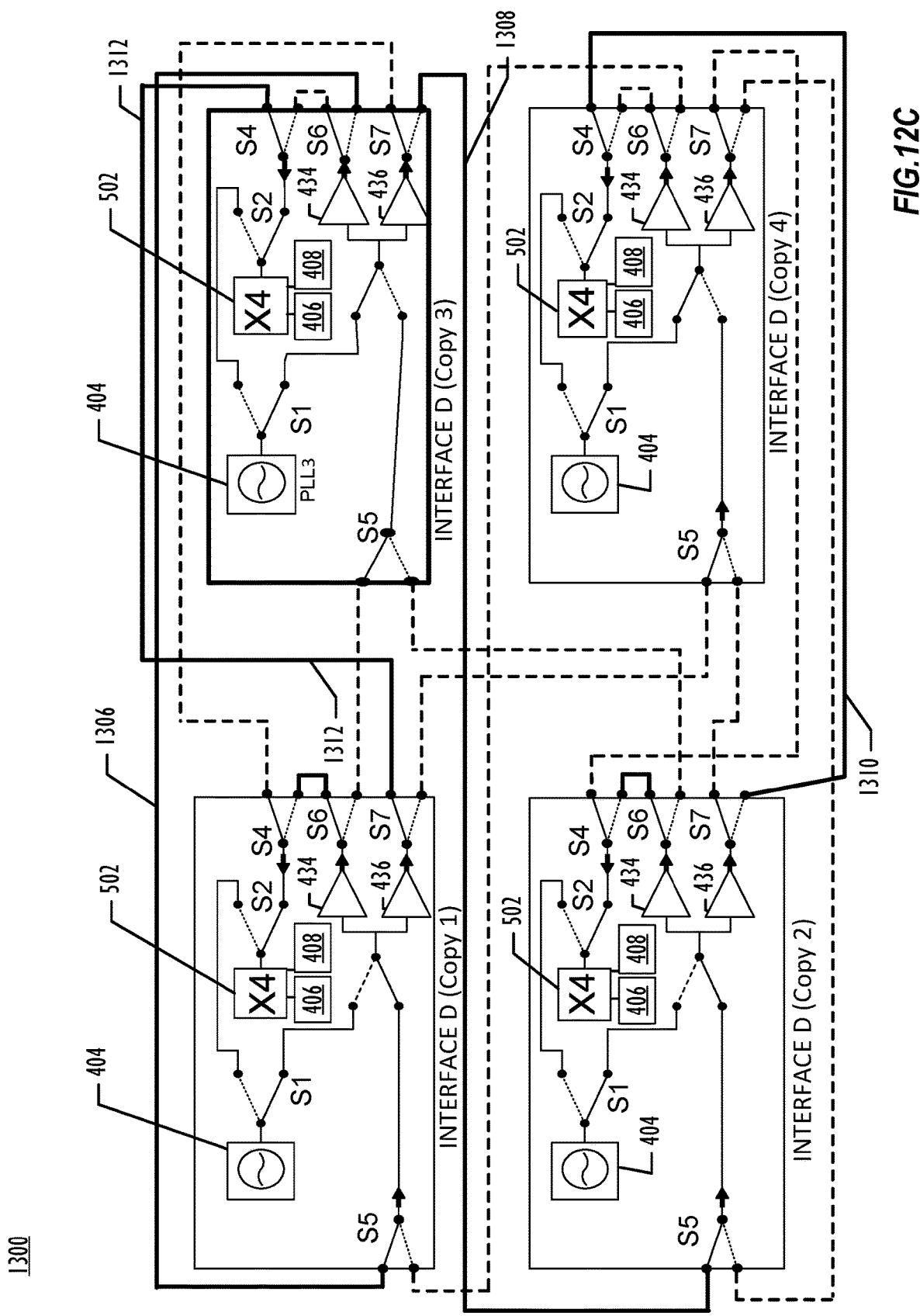

FIG. 12C illustrates array 1300 at a third time. At the third time, copy 3 of interface-D drives the array 1300. The oscillation signal from copy 3 of interface-D is delivered to switch S5 of interface-D (copy 1) through line 1306, and to switch S5 of interface-D (copy 2) through line 1308. The oscillation signal from copy 3 of interface-D is delivered by interface-D (copy 2) to interface-D (copy 4) through line 1310. The oscillation signal from copy 3 of interface-D is returned to copy 3 of interface-D from interface-D (copy 1) through return path 1312.

Figure 12D:
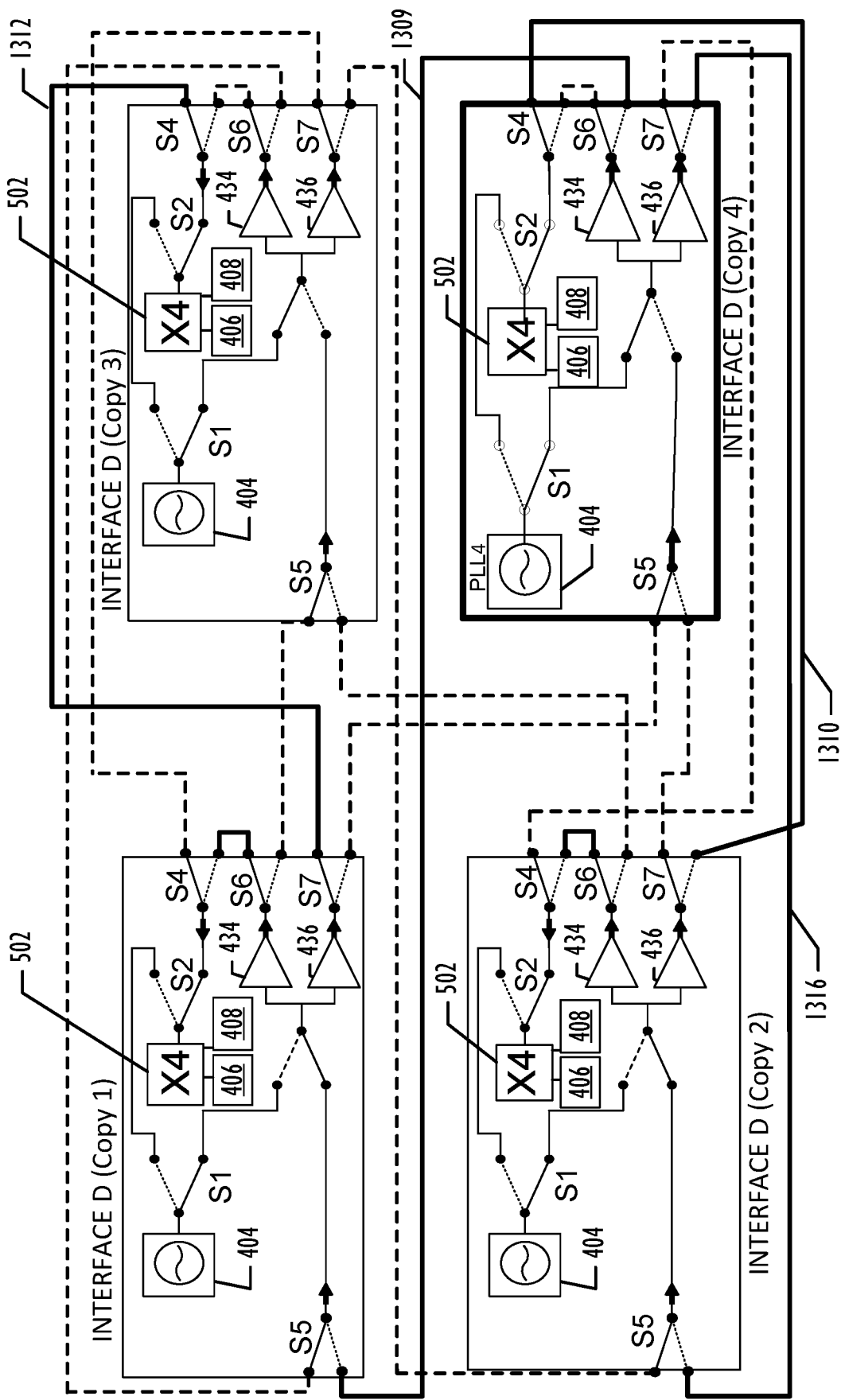

FIG. 12D illustrates array 1300 at a fourth time. At the fourth time, copy 4 of interface-D drives the array 1300. The oscillation signal from copy 4 of interface-D is delivered to switch S5 of interface-D (copy 1) through line 1309, and to switch S5 of interface-D (copy 2) through line 1316. The oscillation signal from copy 4 of interface-D is delivered by interface-D (copy 1) to interface-D (copy 3) through line 1312. The oscillation signal from copy 4 of interface-D is returned to copy 4 of interface-D from interface-D (copy 2) through return path 1310. It will be understood that for the configuration shown in FIGS. 12A-D, that any of the copies of interface-D could be assigned to always be the master and the others always be the follower. It will be understood that for the configuration shown in FIGS. 12A-D, each of the copies of interface-D that either interface could be cascaded with one or more additional interfaces, (e.g., 402, 600, 800, 900, 1000).

Examples of this disclosure further include:

Example 1. An electronic circuit, comprising: an oscillation circuit (e.g., 410), the oscillation circuit comprising: a first amplifier (e.g., 412) configured to amplify a first signal; a first switch (e.g., S1) configured to receive the first signal from the first amplifier and couple the first signal, alternately to a second switch (e.g., S2) and to a third switch (e.g., S3), wherein the second switch is configured to select, alternately, the first signal and a second signal from a first input port (e.g., 442), and deliver the signal selected by the second switch to a second amplifier (e.g., 418), and wherein the second amplifier is configured to amplify the signal received from the second switch; a third switch (e.g., S3) configured to select, alternately, the first signal from the first switch and a third signal from a second input port (e.g., 424), and deliver the signal selected by the third switch to a third amplifier (e.g., S3), wherein the third amplifier is configured to amplify the signal received from the third switch; and a splitter (e.g., 430) configured to receive the signal from the third amplifier and deliver a first copy of the signal received from the third amplifier to a fourth amplifier (e.g., 434) and deliver a second copy (e.g., 436) of the signal received from the third amplifier to a fifth amplifier; wherein the fourth amplifier is configured to amplify the first copy of the signal from the splitter and the fifth amplifier is configured to amplify the second copy of the signal from the splitter.

Example 2. The electronic circuit of example 1, further comprising: a first transceiver circuit, the first transceiver circuit (e.g., 402) comprising: an oscillation signal generator (e.g., 404) configured to generate a first oscillation signal, the first oscillation signal corresponding to the first signal, the oscillation signal generator connected to the first amplifier (e.g., 412) of the oscillation circuit (e.g., 410) and configured to deliver the first signal to the first amplifier; and a second splitter (e.g., 420), the second splitter connected to the second amplifier of the oscillation circuit and configured to receive the amplified signal from the second amplifier (e.g., 418) of the oscillation circuit and deliver a first copy of the signal from the second amplifier to a transmitter (e.g., 406) and further configured to deliver a second copy of the signal from the second amplifier of the oscillation circuit to a receiver (e.g., 408).

Example 3. The electronic circuit of example 2, further comprising: a second transceiver circuit (e.g., 800), wherein the second transceiver circuit (see e.g., interface-B, copy 2, FIG. 10A) is an identical copy of the first transceiver circuit (e.g., 402), the oscillation signal generator of the second transceiver circuit configured to generate a second oscillation signal; a fourth switch (e.g., S4) configured to select, alternately, the signal from the fifth amplifier (e.g., 436) of the first transceiver circuit and the signal from the fourth amplifier (e.g., 434) of the second transceiver circuit, and deliver the signal selected by the fourth switch to the second switch of the first transceiver circuit; and a fifth switch configured to select, alternately, the signal from the fifth amplifier of the first transceiver circuit and the signal from fourth amplifier of the second transceiver circuit and deliver the signal selected by the fifth switch to the second switch of the second transceiver circuit, wherein the oscillation signal generator of the first transceiver circuit is configured to generate the first oscillation signal during a settling time of the oscillation signal generator of the second transceiver circuit, and the oscillation signal generator of the second transceiver circuit is configured to generate the second oscillation signal during a settling time of the oscillation signal generator of the first transceiver circuit.

Example 4. The electronic circuit of example 2, further comprising: a second transceiver circuit, wherein the second transceiver circuit is an identical copy of the first transceiver circuit, the oscillation signal generator of the second transceiver circuit configured to generate a second oscillation signal; a third transceiver circuit, wherein the third transceiver circuit comprises identical copies of the components of the first transceiver circuit, and further comprises an additional switch configured to select, alternately, the output signal from the fourth amplifier of the first transceiver circuit and the output signal from the fourth amplifier of the second transceiver circuit; and a fourth transceiver circuit, wherein the third transceiver circuit comprises identical copies of the components of the first transceiver circuit, and further comprises an additional switch configured to select, alternately, the output signal from the fifth amplifier of the first transceiver circuit and the output signal from the fifth amplifier of the second transceiver circuit, wherein the oscillation signal generator of the first transceiver circuit is configured to generate the first oscillation signal during a settling time of the oscillation signal generator of the second transceiver circuit, and the oscillation signal generator of the second transceiver circuit is configured to generate the oscillation signal of the second oscillation signal generator during a settling time of the oscillation signal generator of the first transceiver circuit.

Example 5. The electronic circuit of example 2, wherein the first transceiver circuit further comprises: a fourth switch configured to select, alternately, a signal from the first input port and a signal from a third input port, and deliver the signal selected by the fourth switch to the second switch; a fifth switch configured to select, alternately a signal from the second input port and a signal from a fourth input port, and deliver the signal selected by the fifth switch to the third switch; a sixth switch configured to couple, alternately, the fourth amplifier to the first output port and third output port; and a seventh switch configured to couple, alternately, the fifth amplifier to the second output port and a fourth output port.

Example 6. The electronic circuit of example 5, further comprising: a second transceiver circuit, wherein the second transceiver is an identical copy of the first transceiver circuit; a third transceiver circuit, wherein the third transceiver is an identical copy of the first transceiver circuit; and a fourth transceiver circuit, wherein the fourth transceiver is an identical copy of the first transceiver circuit, wherein the first input port of the first transceiver circuit is connected to the second output port of the third transceiver circuit, the second input port of the first transceiver circuit is connected to the third output port of the third transceiver circuit, the third input port of the first transceiver circuit is connected to the first output port of the first transceiver circuit, the fourth input port of the first transceiver circuit is connected to the second output port of the fourth transceiver circuit, the second output port of the first transceiver circuit is connected to the first input port of the third transceiver circuit, and the third output port of the first transceiver circuit is connected to the second input port of the third transceiver circuit, the first input port of the second transceiver circuit is connected to second output port of the fourth transceiver circuit, the second input port of the second transceiver circuit is connected to the fourth output port of the third transceiver circuit, the third input port of the second transceiver circuit is connected to the first output port of the second transceiver circuit, the fourth input port of the second transceiver circuit is connected to fourth output port of the fourth transceiver circuit, and the oscillation signal generator of the second transceiver circuit is configured to generate a second oscillation signal during a settling time of the oscillation signal generator of the first transceiver circuit.

Example 7. The electronic circuit of example 6, wherein the oscillation signal generator of the third transceiver circuit is configured to generate a third oscillation signal during a settling time of the oscillation signal generator of the second transceiver circuit.

Example 8. The electronic circuit of example 7, wherein the oscillation signal generator of the fourth transceiver circuit is configured to generate a fourth oscillation signal during a settling time of the oscillation signal generator of the third transceiver circuit.

Example 9. The electronic circuit of example 8, wherein the oscillation signal generator of the first transceiver circuit is configured to generate the first oscillation signal during a settling time of the oscillation signal generator of the fourth transceiver circuit.

Example 10. The electronic circuit of example 9, wherein the transmitter of each of the transceiver circuits is configured to transmit each of the oscillation signals generated by the oscillation signal generator of each of the other transceiver circuits.

Example 11. The electronic circuit of example 10, wherein the oscillation signal generators of each of the transceivers is connected to a radar array control circuit.

Example 12. The electronic circuit of example 10, wherein the oscillation signals are chirp signals.

Example 13. The electronic circuit of example 10, wherein the periodicity of each the oscillation signals is the same as the periodicity of each of the other signals.

Example 14. A method of manufacturing a radar unit, comprising: providing a first amplifier, a second amplifier, a third amplifier, a fourth amplifier, and a fifth amplifier; providing a first switch, a second switch, and a third switch, providing a first splitter; constructing an oscillation circuit, wherein constructing the oscillation circuit comprises: configuring the first amplifier to amplify a first signal; connecting the first amplifier to the first switch; configuring the first switch to receive the first signal from the first amplifier and couple the first signal, alternately to the second switch and to the third switch; configuring the second switch to select, alternately, the first signal from the first switch and a second signal from a first input port, and deliver the signal selected by the second switch to the second amplifier; configuring the third switch to select, alternately, the first signal from the first switch and a third signal from a second input port, and deliver the signal selected by the third switch to the third amplifier; connecting the first splitter to the third amplifier, the fourth amplifier and the fifth amplifier; configuring the first splitter to receive a signal from the third amplifier and deliver a first copy of the signal received from the third amplifier to a fourth amplifier and deliver a second copy of the signal received from the third amplifier to a fifth amplifier.

Example 15. The method of manufacturing a radar unit of example 14, further comprising: providing an oscillation signal generator, a second splitter, a transmitter, and a receiver; constructing a first transceiver circuit, wherein constructing the first transceiver circuit comprises: connecting the oscillation signal generator to the first amplifier; configuring the oscillation signal generator to generate a first oscillation signal, the first oscillation signal corresponding to the first signal, and deliver the first signal to the first amplifier; and connecting the second splitter to the second amplifier, the transmitter, and the receiver; configuring the second splitter to receive an amplified signal from the second amplifier and deliver a first copy of the signal from the second amplifier to the transmitter and deliver a second copy of the signal from the second amplifier to the receiver.

Example 16. The method of manufacturing a radar unit of example 15, further comprising: providing a second transceiver circuit, wherein the second transceiver circuit is an identical copy of the first transceiver circuit; providing a fourth switch configured to select, alternately, the signal from the fourth amplifier of the first transceiver circuit and the signal from the fifth amplifier of the second transceiver circuit, and deliver the signal selected by the fourth switch to the second switch of the first transceiver circuit; providing a fifth switch configured to select, alternately, the signal from the fifth amplifier of the first transceiver circuit and the signal from fourth amplifier of the second transceiver circuit and deliver the signal selected by the fifth switch to the second switch of the second transceiver circuit; configuring the oscillation signal generator of the first transceiver circuit to generate the first oscillation signal during a settling time of the oscillation signal generator of the second transceiver circuit; and configuring the oscillation signal generator of the second transceiver circuit to generate the second oscillation signal during a settling time of the oscillation signal generator of the first transceiver circuit.

Example 17. The method of manufacturing a radar unit of example 15, further comprising: providing a second transceiver circuit, wherein the second transceiver circuit is an identical copy of the first transceiver circuit, and configuring the oscillation signal generator of the second transceiver circuit to generate a second oscillation signal; providing a third transceiver circuit, wherein the third transceiver circuit comprises identical copies of the components of the first transceiver circuit, and further comprises an additional switch, and configuring the additional switch to select, alternately, the output signal from the fourth amplifier of the first transceiver circuit and the output signal from the fourth amplifier of the second transceiver circuit; providing a fourth transceiver circuit, wherein the third transceiver circuit comprises identical copies of the components of the first transceiver circuit, and further comprises an additional switch, and configuring the additional switch to select, alternately, the output signal from the fifth amplifier of the first transceiver circuit and the output signal from the fifth amplifier of the second transceiver circuit; configuring the oscillation signal generator of the first transceiver circuit to generate the first oscillation signal during a settling time of the oscillation signal generator of the second transceiver circuit; and configuring the oscillation signal generator of the second transceiver circuit is configured to generate the second oscillation signal during a settling time of the oscillation signal generator of the first transceiver circuit.

Example 18. The method of manufacturing a radar unit of example 15, further comprising: providing a fourth switch, and configuring the fourth switch to select, alternately, a signal from the first input port and a signal from a third input port, and deliver the signal selected by the fourth switch to the second switch; providing a fifth switch, and configuring the fifth switch to select, alternately a signal from the second input port and a signal from a fourth input port, and deliver the signal selected by the fifth switch to the third switch; providing a sixth switch, configuring the fifth switch to couple, alternately, the fourth amplifier to the first output port and third output port; and providing a seventh switch and configuring the seventh switch to couple, alternately, the fifth amplifier to the second output port and a fourth output port.

Example 19. A method of operating an electronic circuit, comprising: amplifying a first signal, using a first amplifier; receiving the first signal, using a first switch, wherein the first switch is configured to receive the first signal from the first amplifier and couple the first signal, alternately to a second switch and to a third switch, wherein the second switch is configured to select, alternately, the first signal and a second signal from a first input port, and deliver the signal selected by the second switch to a second amplifier, and wherein the second amplifier is configured to amplify the signal received from the second switch; receiving the first signal using the third switch, wherein the third switch is configured to select, alternately, the first signal from the first switch and a third signal from a second input port; delivering the signal selected by the third switch to a third amplifier; amplifying, using the third amplifier, the signal selected by the third switch; receiving, at a first splitter, the signal from the third amplifier; delivering, using the first splitter, a deliver a first copy of the signal received from the third amplifier to a fourth amplifier delivering, using the second splitter, a second copy of the signal received from the third amplifier to a fifth amplifier.

Example 20. The method of operating an electronic circuit of example 19, further comprising: generating the first signal using an oscillation signal generator; receiving the first signal at the first amplifier; receiving, through a first input port, a second signal corresponding the first signal at the second switch; receiving the second signal at the second amplifier through the second switch; receiving the second signal from the second amplifier at the second splitter; delivering, using the second splitter, a first copy of the signal from the second amplifier to a transmitter; and delivering, using the second splitter, a second copy of the signal from the second amplifier of the oscillation circuit to a receiver.

Though the operations described herein may be set forth sequentially for explanatory purposes, in practice the method may be carried out by multiple components operating concurrently and perhaps even speculatively to enable out-of-order operations. The sequential discussion is not meant to be limiting. Moreover, the focus of the foregoing discussions has been radar sensors, but the principles are applicable to any pulse-echo or continuous-wave travel time measurement systems. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An integrated circuit comprising:
   at least one local input port to receive a chirp signal from a local generator;
   one or more primary input ports to each receive a respective chirp signal from a remote source;
   a primary switch arrangement operable to switch between the chirp signals from the at least one local input port and the one or more primary input ports to produce a composite signal having a chirp sequence with at least one chirp that begins during a settling period of a previous chirp; and
   one or more primary output ports to supply a local oscillator signal to a transmitter and a receiver based on the composite signal.

2. The integrated circuit of claim 1, further comprising:
   multiple repeater ports to produce multiple copies of an amplified chirp signal.

3. The integrated circuit of claim 2, further comprising:
   one or more secondary input ports to each receive a respective chirp signal from a remote source; and
   a secondary switch arrangement operable to switch between the chirp signals from the at least one local input port and the one or more secondary input ports to provide the amplified chirp signal to the multiple repeater ports, the amplified chirp signal having a chirp sequence with at least one chirp that begins during a settling period of a previous chirp.

4. The integrated circuit of claim 3, the previous chirp originating from the remote source.

5. The integrated circuit of claim 3, wherein the one or more secondary input ports comprise multiple secondary input ports.

6. The integrated circuit of claim 3, wherein the primary switch arrangement and the second switch arrangement are different.

7. The integrated circuit of claim 1, further comprising at least one frequency multiplier that frequency multiplies the composite signal to produce the local oscillator signal.

8. The integrated circuit of claim 7, wherein the at least one frequency multiplier that frequency multiplies the composite signal to produce the local oscillator signal frequency, multiplies the composite signal by integer multiples of four.

9. The integrated circuit of claim 1, wherein the one or more primary input ports comprise multiple primary input ports.

10. An integrated circuit comprising:
at least one primary input port to receive an amplified chirp signal;
one or more primary output ports to supply a local oscillator signal to a transmitter and a receiver based at least in part on the amplified chirp signal;
multiple secondary input ports to each receive a respective chirp signal from a remote source;
multiple repeater ports to produce multiple copies of the amplified chirp signal; and
a secondary switch arrangement operable to switch between the chirp signals from the multiple secondary input ports to provide to the multiple repeater ports the amplified signal having a chirp sequence with at least one chirp that begins during a settling period of a previous chirp.

11. The integrated circuit of claim 10, wherein the previous chirp corresponds to the amplified chirp signal.

12. The integrated circuit of claim 10, wherein the previous chirp corresponds to a respective chirp signal from a remote source.

13. The integrated circuit of claim 10, further comprising a frequency multiplier that frequency multiplies the amplified signal to produce the local oscillator signal.

14. The integrated circuit of claim 13, wherein the at least one frequency multiplier that frequency multiplies the composite signal to produce the local oscillator signal frequency, multiplies the composite signal by integer multiples of three.

15. The integrated circuit of claim 10, wherein the one or more primary input ports comprise multiple primary input ports.

16. The integrated circuit of claim 10, further comprising:
at least one local input port to receive a local chirp signal from a local generator, wherein the second switch arrangement is further operable to include chirps from the local chirp signal in the chirp sequence.

17. A radar system interface that comprises:
a first plurality of integrated circuits, each of the first plurality of integrated circuits having:
a local generator that provides a chirp signal;
at least one input port that receives a chirp signal from a remote source;
one or more repeater ports operable to provide multiple copies of an amplified chirp signal;
a primary output port that supplies a local oscillator signal to a transmitter or receiver;
at least one switch arrangement operable to combine multiple chirp signals to a produce a composite signal having a chirp sequence with at least one chirp that begins during a settling period of a previous chirp; and
a wiring configuration enabling the first plurality of integrated circuits to collectively produce at least one composite signal, to convert the at least one composite signal into multiple copies of an amplified chirp signal, and to each provide a copy of the amplified chirp signal as the local oscillator signal to a transmitter or receiver.

18. The radar system interface of claim 17, further comprising:
a second plurality of integrated circuits, each of the second plurality of integrated circuits having:
at least one input port that receives a chirp signal from a remote source;
one or more repeater ports operable to provide multiple copies of an amplified chirp signal;
a primary output port that supplies a local oscillator signal to a transmitter or receiver;
at least one switch arrangement operable to combine multiple chirp signals to a produce a composite signal having a chirp sequence with at least one chirp that begins during a settling period of a previous chirp; and
a wiring configuration enabling the second plurality of integrated circuits to collectively produce at least one composite signal, to convert the at least one composite signal into multiple copies of an amplified chirp signal, and to each provide a copy of the amplified chirp signal as the local oscillator signal to a transmitter or receiver,
wherein each of the multiple chirp signals originates at the local generator of one or more integrated circuits from among the first plurality of integrated circuits.

19. The radar system interface of claim 18, wherein a quantity of integrated circuits in the first plurality of integrated circuits is equal to a quantity of integrated circuits in the second plurality of circuits.

20. The radar system interface of claim 18, wherein a quantity of integrated circuits in the second plurality of integrated circuits is at least double a quantity of integrated circuits in the first plurality of circuits.

* * * * *